US006419429B1

(12) United States Patent
Long et al.

(10) Patent No.: US 6,419,429 B1
(45) Date of Patent: Jul. 16, 2002

(54) ROUTER WITH ERGONOMIC HANDLES

(75) Inventors: Charles Keith Long, Seneca; Norman Hugh Bouwhuis, Easley; James Morgan, Liberty; Kenneth M. Brazell, Piedmont, all of SC (US)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/870,306

(22) Filed: May 30, 2001

(51) Int. Cl.[7] .............................. B23C 1/20; S27C 5/20

(52) U.S. Cl. ............... 409/182; 144/136.95; 144/154.5; 16/430; 16/900

(58) Field of Search ................................ 409/182, 175, 409/181; 16/430, 900; 144/136.95, 154.5

(56) References Cited

U.S. PATENT DOCUMENTS

| | | | | |
|---|---|---|---|---|
| 1,899,883 A | * | 2/1933 | Sacrey | 409/182 |
| 2,842,173 A | | 7/1958 | Turner et al. | |
| 3,363,510 A | * | 1/1968 | Burrows et al. | 409/182 |
| 3,450,917 A | | 6/1969 | Zelik et al. | |
| 3,466,973 A | | 9/1969 | Rees | |
| 3,587,387 A | * | 6/1971 | Burrows et al. | 409/182 |
| 3,767,876 A | | 10/1973 | Batson | |
| 4,143,691 A | * | 3/1979 | Robinson | 409/182 |
| 4,187,046 A | | 2/1980 | Atherton | |
| 4,606,685 A | | 8/1986 | Maier et al. | |
| 4,655,653 A | * | 4/1987 | Hall et al. | 409/182 |
| 4,938,642 A | * | 7/1990 | Imahashi et al. | 409/182 |
| 5,143,494 A | * | 9/1992 | McCurry | 409/182 |
| 5,988,241 A | | 11/1999 | Bosten et al. | |
| 6,065,912 A | | 5/2000 | Bosten et al. | |
| 6,266,850 B1 | * | 7/2001 | Williams et al. | 16/430 |

* cited by examiner

*Primary Examiner*—Daniel W. Howell
(74) *Attorney, Agent, or Firm*—Brooks & Kushman P.C.

(57) ABSTRACT

A router having a base and an adjustably positioned motor assembly is provided with a pair of ergonomic elongate handles on opposite right and left sides of the motor housing. The elongate handles which are connected to and spaced from the motor housing by a pair of bridge members are ellipsoidal in shape when viewed in a transverse side elevation. Each elongate handle has a longitudinal length L having a large upper end, diameter Z and a lower small end diameter Z'.

20 Claims, 4 Drawing Sheets

*Fig. 4*
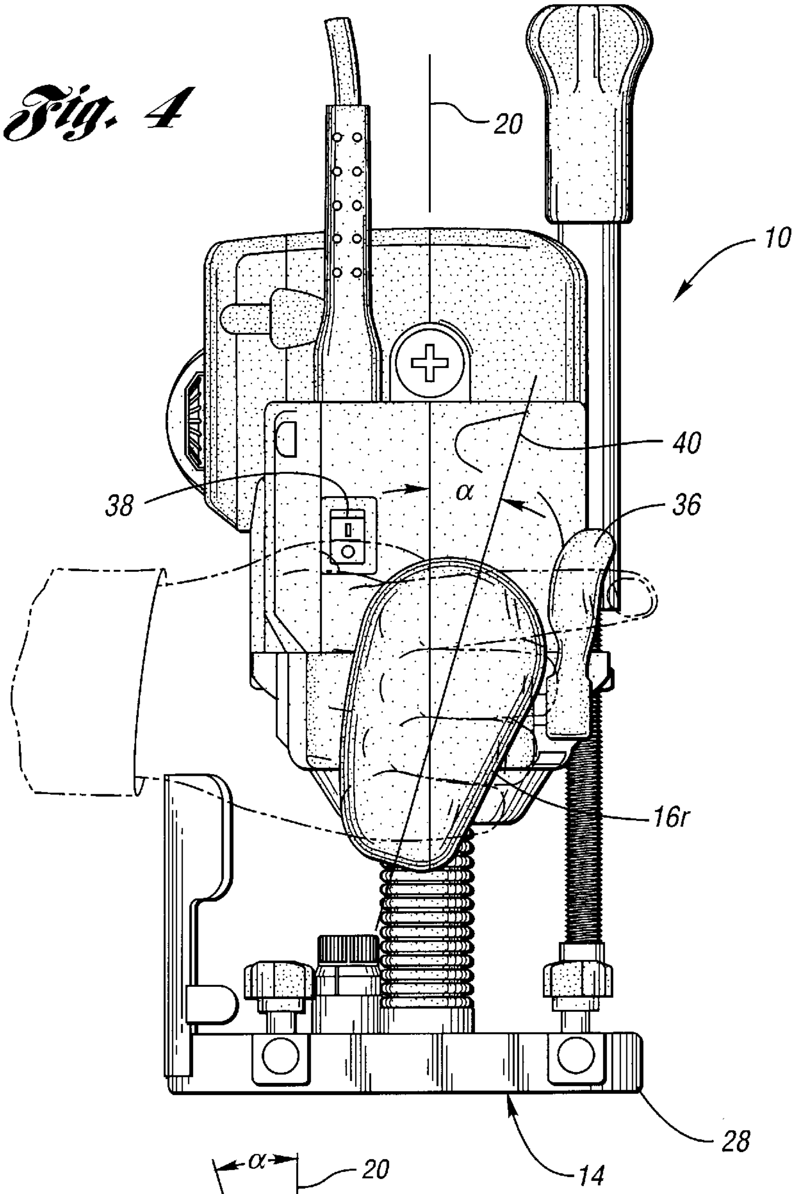
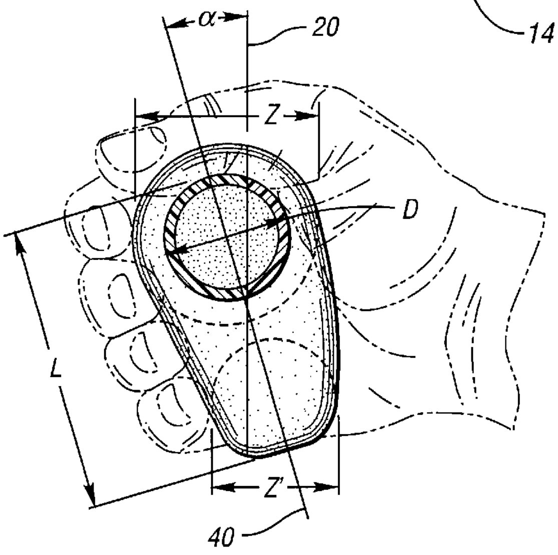
*Fig. 5*

ROUTER WITH ERGONOMIC HANDLES

TECHNICAL FIELD

The present invention relates to a pair of ergonomic handles for a router.

BACKGROUND ART

Routers are typically provided with a pair of handles on opposed right and left sides of the motor housing enabling a user to securely grasp the router during use. Plunge routers include a motor housing which can be vertically moved relative to a base proximate to a workpiece while the router bit is rotating. To vertically move the plunge router, the user is required to securely grasp the router handles during this plunging operation. Additionally, the user must be able to grasp the plunge lock lever and the motor on/off switch with the user's forefinger or thumb without releasing their grasp of the handle. A variety of router handles have been designed over the years to address these basic needs. In recent years, power tool manufacturers have recognized that handles should do more than simply enable the user to grasp the router. Rather, the handles should be designed for user comfort during extended periods of router use while also allowing the user to securely grip and control the router when making aggressive cuts with large diameter router bits, and while also allowing the user to accurately guide and control the router when making fine detail cuts with small diameter router bits and soft wood.

DISCLOSURE OF INVENTION

Accordingly, it is a design objective of the present invention to provide a router handle configuration which enables the user to securely grasp the router handles, while making aggressive and fine cuts. It is also a design objective to maximize user comfort even when the router is used for extended periods of time. The present invention is further designed to provide easy access from at least one of the handles to the router on/off switch and plunge lock lever, so that the user can depress the on/off switch and lock lever during a plunge in a retract motion without significantly loosening the user's grip on the router assembly.

A router of the present invention is provided having a motor assembly that includes a motor housing aligned along a vertical axis. The motor housing includes a motor having a rotary output shaft projecting from the motor housing to support a tool holder for accepting a router bit. The motor assembly is adjustably fixable relative to a base at various user selected positions. The base is a generally flat lower surface which is perpendicular to the motor vertical access. A pair of elongate handles are oriented on and are transversely spaced from and connected to opposite right and left sides of the motor housing by a pair of bridge members. The elongate handles are generally ellipsoidal in shape when viewed in transverse side elevational view. The elongate handles have a longitudinal axis and longitudinal length L. Each elongate handle has a relatively large upper end having an effective diameter Z and a relatively smaller lower end having a diameter Z'. The longitudinal length L is preferably between 2 and 4 times Z', and preferably about 2.5 times Z'.

In the preferred embodiment the longitudinal axes of the elongate handles are inclined clockwise relative to the motor axis when viewed from the right side elevational view. Additionally, to comfortably align the elongate handles with the user's hands, wrists and forearms in normal usage, it is preferred that the longitudinal axis of the right elongate handle be inclined counter-clockwise and the longitudinal axis of the left elongate handle be inclined clockwise relative to the motor axis when viewed from the front side elevational view.

BRIEF DESCRIPTION OF DRAWINGS

FIG. 4 is a right side elevational view; and

FIG. 5 is a cross-sectional side elevational view taken along line 5–5 of FIG. 3.

BEST MODE FOR CARRYING OUT THE INVENTION

Router 10 illustrates a preferred embodiment of the present invention shown in FIGS. 1–5. Router 10, for the purposes of describing the present invention, is made up of three main components: a motor assembly 12, a base assembly 14; and pair of elongate handles 16R,16L. Router 10 illustrates a plunge router design. Motor assembly 12 can move vertically relative to base 14. Such movement enables the user to plunge the motor assembly into and raise the motor assembly away from a workpiece (not shown) upon which base 14 is supported. The handles of the present invention can also be used on a fixed base style router.

Figure 1:
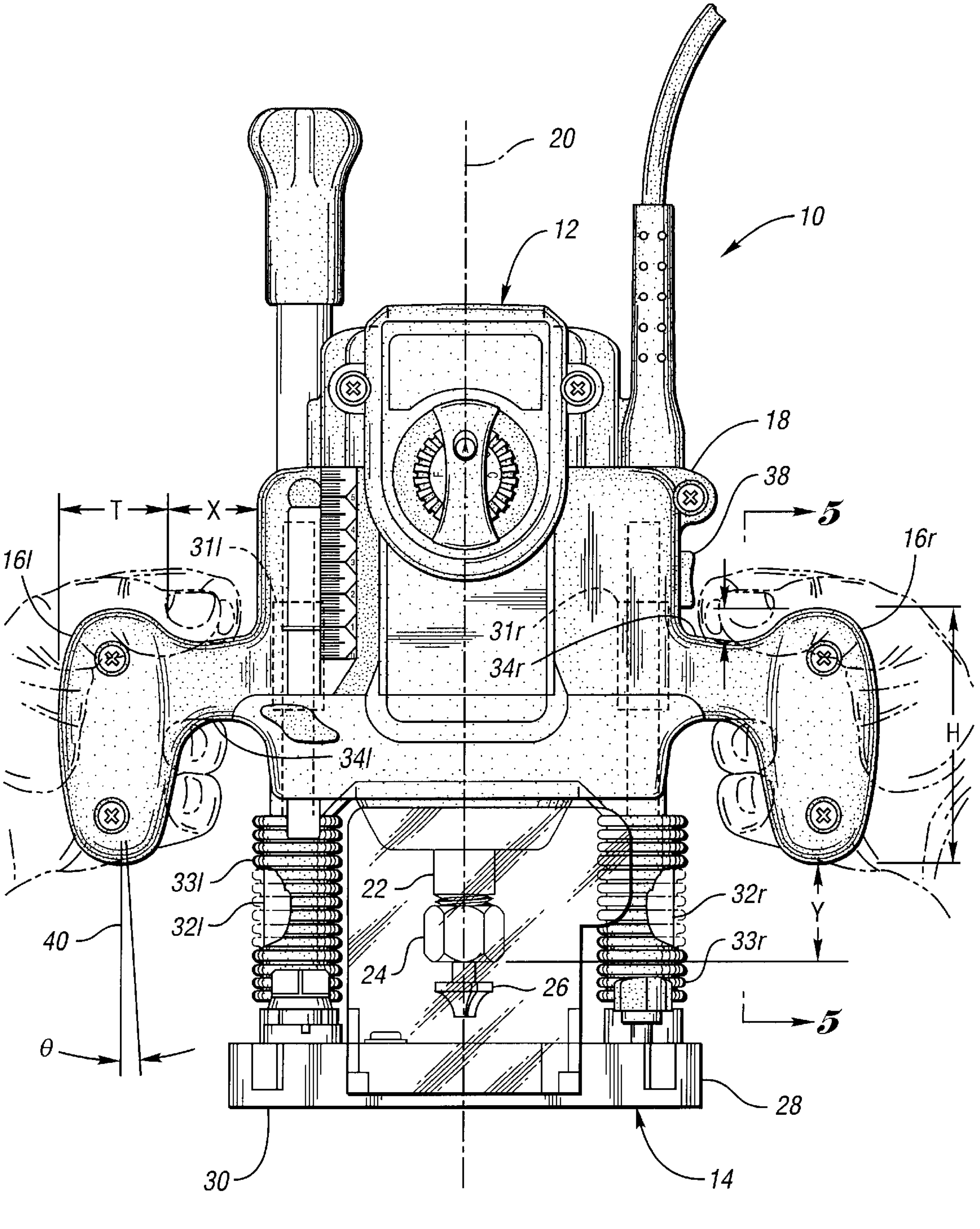
FIG. 1 is a front side elevational view.

Motor assembly 12 includes a motor housing 18, which is aligned along a vertical motor axis 20. Motor housing 18 is provided with a front, back, right, left, top and bottom side which define an interior cavity therein. The interior cavity includes an electric motor (not shown) which provides a rotary output shaft 22 that extends from the bottom side of the motor housing 18. The shaft 22 includes a tool holder 24 on a portion of the free end extending from the bottom side of the motor to accept a router bit 26, as shown in FIG. 1.

Base 14 includes an annular body 28 having a generally flat lower planar surface 30 for cooperating with a workpiece. Base 14 is provided with a pair of columns *32r*,*32l* that extend upward from annular body 28 generally parallel to motor axis 20, to support motor assembly 12. Motor housing 18 is provided with a pair of internal tubular bushings *31r* and *31l* shown in phantom outline which coaxially surround columns *32r* and *32l*. Columns *32r*,*32l* are surrounded by coil spring (not shown) which bias the motor assembly 12 upward relative to base 14. Columns *32r*,*32l* are each surrounded by an elastic sleeve *33r* and *33l* that keeps dust and debris away from the machined columns *32r*,*32l*.

Figure 2:
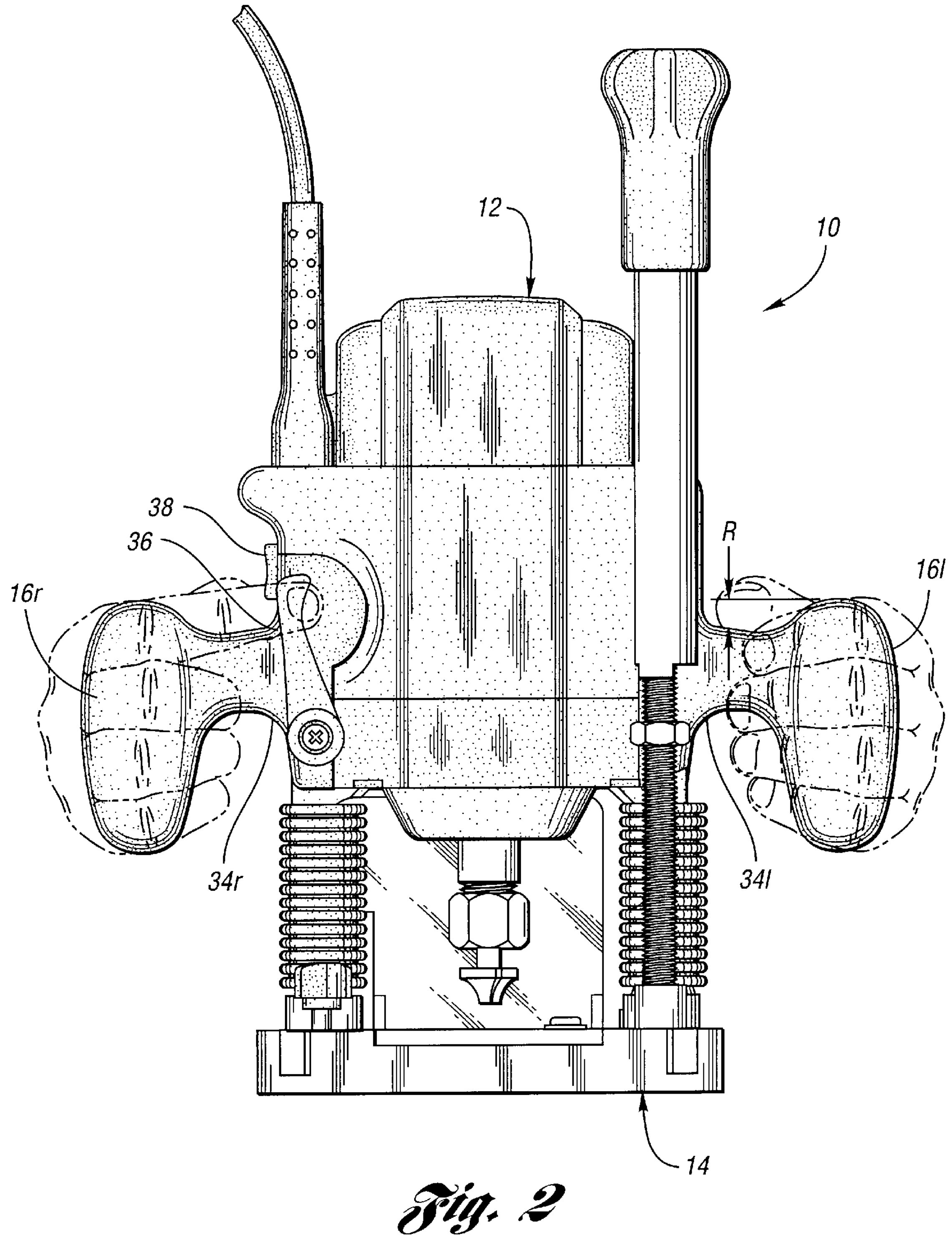
FIG. 2 is a rear side elevational view.
Figure 3:
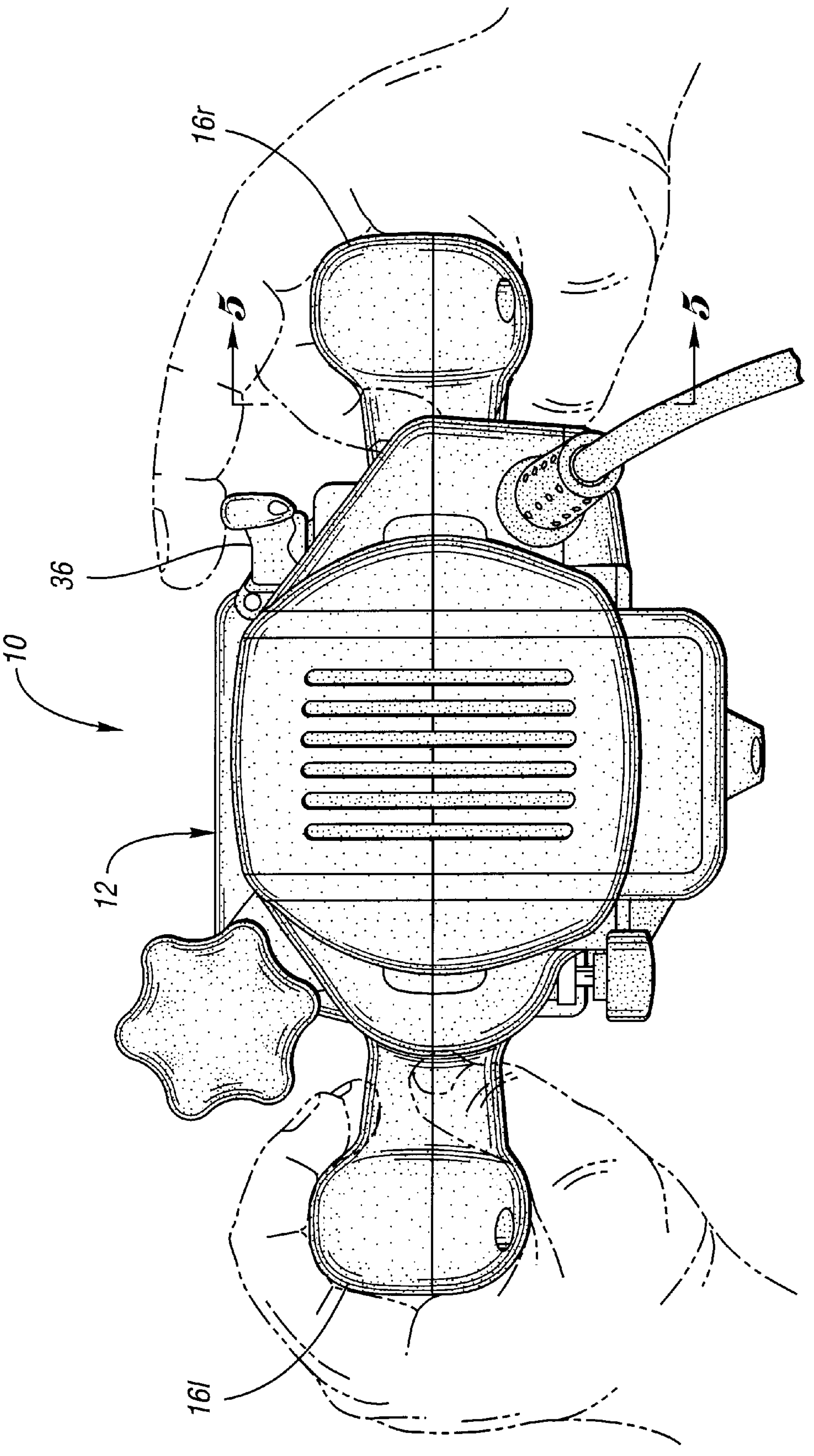
FIG. 3 is a top plain view.

Elongate handles *16r*,*16l* are transversely spaced from and connected to opposite right and left sides of the motor housing 18 by a pair of bridge members *34r*,*34l*. Elongate handles *16r*,*16l* enable a user to securely grasp and move the router 10 relative to base 14, as illustrated in FIG. 2. The motor assembly 28 is provided with a lock lever 36 on the rear side of the motor housing 18 adjacent elongate handle *16r*, as shown in FIG. 2. An internal spring mechanism (not shown) biases locking lever 36 in the generally vertical lock position shown in FIG. 2, and further illustrated in FIGS. 3 and 4. A user can extend his or her forefinger and grasp the locking lever 36 in order to pull it to the release position so that the motor assembly 12 can be vertically moved relative to base 14. When the motor assembly 18 is in a desired location, the user simply releases the locking lever 36 and the internal spring returns it to the locked position which securely maintains the motor assembly at a fixed position relative to the base. This position then may remain fixed during router operation. Additionally, the motor housing 18 is provided with an on/off switch 38 adjacent one of the elongate handles to enable the user to turn the router on and off without releasing the user's grip on the elongate handles **16*r*,16*l***.

The elongate handles **16*r*,16*l* are generally ellipsoidal in shape when viewed in a transverse side view, as illustrated in FIGS. 4 and 5. The elongate handles 16*r*,16*l* have a longitudinal axis 40 and a longitudinal length L measured along axis 40. Each elongate handle 16*r*,16*l* has a relatively large upper end and a relatively small lower end. The larger upper end has an effective diameter Z while the smaller lower end has an effective diameter Z', as illustrated best in FIG. 5. The ellipsoidal handle configuration is not a classic symmetrical ellipse, but rather an egg shape that is generally symmetrical about its longitudinal axis 40. The egg shape of elongate handles 16*r*,16*l* results in a natural ergonomic fit of the handles 16*r*,16*l* into the user's hand, which enables all of the user's fingers, particularly the user's small and ring finger, to comfortably grip the elongate handles. Preferably, the larger end diameter Z is at least 1.2 times the smaller end diameter Z' and most preferably about 1.5 time Z'. Longitudinal length L preferably is between 2 and 4** times the Z' diameter and most preferably about 2.5 times Z'. In a typical router, length L is between 3 and 4 inches and in most instances between 3.2 and 3.5 inches.

Elongate handle 16R when viewed in right side elevation, as shown in FIG. 4, the longitudinal axis 40 is inclined clockwise relative to motor axis 20 and indicated by an angle alpha (α). Alpha a is preferably between 10° and 35° and most preferably between 15° and 25°. The left elongate handle 16L is a mirror image of right elongate handle 16R. The left handle 16L, if viewed from a left side elevational view, would be inclined counter-clockwise relative to motor axis 20 at the same angle alpha α.

When the router 10 is viewed in front side elevational view, as shown in FIG. 1, the elongate handles 16R,16L have their longitudinal axes 40 inclined at an angle beta α, relative to motor axis 20. Right elongate handle 16R will be inclined counter-clockwise while left elongate handle 16L will be inclined clockwise relative to motor axis 20. The angled beta β, in order to provide improved user comfort and control, is preferably between 0° and 15°, and most preferably between 2° and 10°.

The elongate handles 16R,16L have a thickness T, as illustrated in FIG. 1. The bridge members 34R,34L have an length X measured along a transverse axis extending through the motor assembly 12 and perpendicular to the motor axis 20. Preferably thickness T is between 0.5 and 1 times Z or about 1 to 2 inches. The length X is preferably 0.5 to 1.0 times Z or about 1 to 2 inches so that the elongate handles are sufficiently outboard of the router motor assembly 12 to provide adequate clearance for the user's fingers yet sufficiently close so that the user may still reach the lock lever 36 and comfortably space the user's hands apart. As illustrated in FIG. 1, bridge members 34R,34L are recessed a distance R below the uppermost end of the elongate handle in order to provide a comfortable support for the user's thumbs. Preferably R is between 0.12 and 0.25 times Z or about 0.25 to 0.5 inches.

The bridge members **34*r*,34*l* are preferably generally circular and slightly oval in shape, as illustrated in FIG. 5. They have an effective diameter D (the diameter or circle having the same cross-sectional area as the bridge member) where D is substantially less then Z, and preferably less than 0.7 times Z and most preferably 0.4 to 0.6 times Z. The elongate handles 16R,16L are designed to comfortably fit a user's hands and comfortably orient the user's wrists and forearms relative to the router, so that the router can be used for extended periods of time in both heavy and light load operations without user fatigue, while maximizing comfort and control. While preferably the elongate handles are a smooth generally ellipsoidal or egg shape as illustrated in FIGS. 4 and 5, and are generally oval or slight ellipsoidal in front view as illustrated in FIG. 1**, slight modifications of this design can be made without deviating from the functional ergonomic features of the invention. For example, the lowermost extreme of the ellipsoidal handle could be flattened or even made slightly pointed without effecting the performance of the handle since the extreme upper end and the extreme lower end of the elongate handle is not typically a load bearing surface when the router is in operation.

In a preferred embodiment, the elongate handles 16R,16L are formed of injection-molded plastic and are integrally formed with the motor housing 18 upper portion. The lower portion of motor housing 18 is provided by an aluminum die-cast yoke. Of course, other variations of this construction can be accomplished while maintaining the ergonomic geometry of the handles. While particularly suited for use with a plunge router, ergonomic handles 16R,16L of the present invention are likewise suitable for use in a fixed base router where adjustment of the motor housing and base is not done while the router is in operation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A router comprising:

a motor assembly having a motor housing aligned along a vertical axis forming a front, back, right, left, top and bottom side which define an interior cavity therein, and a motor oriented within the motor housing interior cavity which is provided with a rotary output shaft projecting from the motor housing bottom side, the output shaft supporting a tool holder on a free end thereof for accepting a router bit;

a base, adjustably affixable to the motor assembly and various user selected positions, the base having a generally flat lower surface which is perpendicular to the motor assembly vertical axis; and a pair of elongate handles transversely spaced from and connected to opposite right and left sides of the motor housing by a pair of bridge members, wherein each of the elongate handles are generally ellipsoidal in shape in transverse side view with a longitudinal axis and a longitudinal length L, an upper large end having an effective diameter Z and a lower small end having an effective diameter Z' where Z is at least 1.2 times Z' and where L is between two and four times Z', wherein the bridge members extend transversely and have an effective diameter D which is less than 0.7 Z, each bridge member being connected to the large end of the respective one of the elongate handles so that the upper surface of the bridge is recessed below the uppermost end of the elongate handle.

2. The router of claim 1 wherein the longitudinal axis of a pair of elongate handles is inclined clockwise relative to the motor axis when viewed in right side elevation.

3. The router of claim 2 wherein the longitudinal axis is inclined 10° to 35° in side elevational view.

4. The router of claim 2 wherein the longitudinal axis is inclined 15° to 25° in side elevation.

5. The router of claim 1 wherein the longitudinal axis of the right elongate handle is inclined counter-clockwise and the longitudinal axis of the left elongate handle is inclined clockwise relative to the motor axis when viewed in front side elevation.

6. The router of claim 5 wherein the longitudinal axis is inclined 0° to 15° in front side elevational view.

7. The router of claim 5 wherein the longitudinal axis is inclined 2° to 10° in front side elevational view.

8. The router of claim 1 wherein the elongate handle has a transverse thickness T which is between 0.5 and 1.0 times Z.

9. The router of claim 1 wherein the bridge members are recessed a distance R below the upper most end of the handle and R is between 0.12 and 0.25 times Z.

10. The router of claim 9 wherein R is between 0.25" and 0.5".

11. The router of claim 1 wherein L falls between 3" and 4".

12. The router of claim 1 wherein L falls between 3.2" and 3.5".

13. The router of claim 1 wherein the router base further includes two columns affixed thereto and the motor assembly is provided with two bushings slidingly cooperating with the two columns of the base and a plunge lock mechanism having a locking lever positioned adjacent one of the elongate handles so the user may lock and unlock the motor assembly relative to the base.

14. The router of claim 13 wherein the lock lever is spring biased in the locked position and the lock lever is positioned relative to the adjacent elongate handle so the user may pull the lever to the release position from the lock position with the user's fingers without substantially releasing the elongate handle.

15. The router of claim 13 wherein the motor housing is provided with an on/off switch adjacent one of the elongate handles enabling the user to turn the motor on and off without substantially releasing the elongate handle.

16. A plunge router comprising:

an annular base having a generally flat lower surface and a pair of generally opposed columns extending perpendicular to the flat lower surface;

a motor assembly having a motor housing aligned along a vertical axis forming a front, back, right, left and bottom side that define an interior cavity therein, and a motor oriented within the motor housing interior cavity which is provided with a rotary output shaft projecting from the motor housing bottom side, the output shaft supporting a tool holder on a free end thereof for accepting a router bit; the motor housing being provided with a pair of guide ways slidingly cooperating with the columns of the base and a plunge lock mechanism including a locking lever for locking the motor housing to the base at various user selected positions, the motor output shaft defining a motor axis which is oriented perpendicular to the base lower surface; and a pair of elongate handles transversely spaced from and connected to opposite right and left sides of the motor housing by a pair of bridge members, wherein each of the elongate handles are generally ellipsoidal in shape in transverse side view with a longitudinal axis and a longitudinal length L, an upper large end having an effective diameter Z and a lower small end having an effective diameter Z' where Z is at least 1.2 times Z' and where L is between three and four inches, wherein the bridge members extend transversely and have an effective diameter which is less than 0.7 Z, each bridge member being connected to the large end of the respective one of the elongate handles so that the upper surface of the bridge is recessed below the uppermost end of the elongate handle.

17. The plunge router of claim 16 wherein the elongate handles have a longitudinal axis inclined 10° to 30° clockwise relative to the motor axis when viewed in right side elevational view.

18. The plunge router of claim 16 wherein the longitudinal axis of the right elongate handle is inclined counter-clockwise 0° to 15° and the longitudinal axis of the left elongate handle is inclined clockwise 0° to 15° relative to the motor axis in front side elevational view.

19. The plunge router of claim 16 wherein the elongate handles have a transverse thickness T which is between 0.5 and 1.0 times Z.

20. The plunge router of claim 16 wherein the bridge members are recessed a distance R below the uppermost end of the elongate handles where R is between 0.12 and 0.25 times Z.

* * * * *